United States Patent
Bergius et al.

(10) Patent No.: US 10,484,187 B2
(45) Date of Patent: *Nov. 19, 2019

(54) CELLULAR NETWORK AUTHENTICATION

(71) Applicant: Nokia Technologies Oy, Espoo (FI)

(72) Inventors: Hannu Bergius, Kangasala (FI); Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/310,328

(22) PCT Filed: May 20, 2014

(86) PCT No.: PCT/FI2014/050382
§ 371 (c)(1),
(2) Date: Nov. 10, 2016

(87) PCT Pub. No.: WO2015/177397
PCT Pub. Date: Nov. 26, 2015

(65) Prior Publication Data
US 2017/0155516 A1    Jun. 1, 2017

(51) Int. Cl.
*H04L 29/06* (2006.01)
*H04L 9/32* (2006.01)
(Continued)

(52) U.S. Cl.
CPC .......... *H04L 9/3271* (2013.01); *H04L 63/083* (2013.01); *H04L 63/205* (2013.01);
(Continued)

(58) Field of Classification Search
CPC .................................................. H04L 9/3271
See application file for complete search history.

(56) References Cited

U.S. PATENT DOCUMENTS 7,281,134 B2   10/2007  Schmit .................. 380/277
8,462,742 B2    6/2013  Song et al.
(Continued)

FOREIGN PATENT DOCUMENTS

CN      1426185 A      6/2003
CN    101080886 A     11/2007
(Continued)

OTHER PUBLICATIONS

Purkhiabani, Masoumeh, and Ahmad Salahi. "Enhanced authentication and key agreement procedure of next generation evolved mobile networks." 2011 IEEE 3rd International Conference on Communication Software and Networks. IEEE, 2011. (Year: 2011).*
(Continued)

*Primary Examiner* — Shawnchoy Rahman
(74) *Attorney, Agent, or Firm* — Harrington & Smith

(57) ABSTRACT

A method, apparatus and computer program in which a cellular terminal: transmits a request that requires authentication procedure triggering to a cellular network and responsively receiving from the cellular network an authentication request message with an indication of a selected cryptographic algorithm from a group of a plurality of cryptographic algorithms; decodes the authentication request message to a decoded authentication request according to the selected cryptographic algorithm and based on a shared secret known by the cellular terminal and a network operator of the cellular terminal; based on the decoded authentication request, the shared secret and the selected cryptographic algorithm, produces and encrypts an authentication response message; and transmits the authentication response message to the cellular network.

17 Claims, 3 Drawing Sheets

(51) Int. Cl.
H04W 12/06 (2009.01)
H04W 12/04 (2009.01)
(52) U.S. Cl.
CPC ........... *H04W 12/04* (2013.01); *H04W 12/06* (2013.01); *H04L 2209/80* (2013.01)

(56) References Cited

U.S. PATENT DOCUMENTS

| | | | | |
|---|---|---|---|---|
| 8,589,689 | B2 | 11/2013 | Palanigounder et al. | .... 713/171 |
| 2005/0025091 | A1* | 2/2005 | Patel | ..................... H04L 63/068 370/328 |
| 2005/0047597 | A1* | 3/2005 | Zheng | ................... H04W 12/02 380/247 |
| 2007/0266260 | A1* | 11/2007 | Kim | ........................ G06F 21/10 713/185 |
| 2008/0002654 | A1 | 1/2008 | Bolin | ............................ 370/339 |
| 2008/0130895 | A1 | 6/2008 | Jueneman et al. | ............. 380/277 |
| 2011/0091036 | A1* | 4/2011 | Norrman | ................. H04L 9/065 380/44 |
| 2011/0191842 | A1* | 8/2011 | Lindholm | ............. H04L 9/3271 726/9 |
| 2011/0269423 | A1 | 11/2011 | Schell et al. | |
| 2011/0314522 | A1* | 12/2011 | Palanigounder | ....... H04B 7/155 726/4 |
| 2012/0144189 | A1* | 6/2012 | Zhong | ................ H04L 63/0853 713/155 |
| 2013/0155954 | A1 | 6/2013 | Wang et al. | ................... 370/328 |
| 2013/0331063 | A1 | 12/2013 | Cormier et al. | |
| 2014/0003604 | A1* | 1/2014 | Campagna | ................ H04L 9/08 380/247 |
| 2014/0051422 | A1* | 2/2014 | Mittal | .................... H04W 12/04 455/419 |
| 2014/0141763 | A1* | 5/2014 | Suh | ........................ H04W 8/265 455/418 |
| 2016/0316368 | A1* | 10/2016 | Gan | ........................ H04W 12/06 |
| 2016/0337786 | A1* | 11/2016 | Kafle | ...................... H04W 4/006 |
| 2016/0366127 | A1* | 12/2016 | Tanoni | ................ H04L 63/0853 |

FOREIGN PATENT DOCUMENTS

| | | | |
|---|---|---|---|
| CN | 102026178 A * | 4/2011 | |
| CN | 102083064 A | 6/2011 | |
| CN | 102150446 A | 8/2011 | |
| CN | 102859966 A | 1/2013 | |
| EP | 1 209 935 A1 | 5/2002 | |
| EP | 1613116 A1 | 1/2006 | |
| EP | 2 723 114 A1 | 4/2014 | |
| JP | 2010161733 A | 7/2010 | |
| WO | 2010/027314 A1 | 3/2010 | |
| WO | 2013/007865 A1 | 1/2013 | |
| WO | WO-2013127190 A1 * | 9/2013 | ........... H04L 63/205 |

OTHER PUBLICATIONS

"Comments on S3-131066 (attachment), TUAK Algorithm Set, Document 1: Algorithm Specification", 3GPP TSG SA WG3 (Security) Meeting #73, S3-131104, Agenda Item: 7.15, Nokia, Nov. 11-15, 2013, 31 pages.
"3rd Generation Partnership Project; Technical Specification Group Core Network and Terminals; Non-Access-Stratum (NAS) protocol for Evolved Packet System (EPS); Stage 3 (Release 12)", 3GPP TS 24.301, V12.2.0, Sep. 2013, pp. 1-352.
"3rd Generation Partnership Project;Technical Specification Group Core Network and Terminals;Mobile radio interface Layer 3 specification; Core network protocols; Stage 3 (Release 12)", 3GPP TS 24.008, V12.3.0, Sep. 2013, pp. 1-683.
"3rd Generation Partnership Project; Technical Specification Group Services and System Aspects; 3GPP System Architecture Evolution (SAE); Security architecture (Release 12)", 3GPP TS 33.401, V12. 10.0, Dec. 2013, pp. 1-121.
"Universal Mobile Telecommunications System (UMTS); Security Features", 3GPP Systems and Services TSG, Security WG, Tdoc s3-99004, Source: ETSI SMG10, UMTS 33.22, V1.0.0, Feb. 2-4, 1999, pp. 1-18.
"Specification of the TUAK Algorithm Set: a Second Example Algorithm Set for the 3gpp Authentication and Key Generation Functions F1, F1*, F2, F3, F4, F5 and F5*", ETSI SAGE Specification, Version 1.0, Aug. 17, 2013, pp. 1-27.
Rizzo et al., "ETSI White Paper No. 1 Security for ICT—the Work of ETSI", ETSI, Sixth Edition, Jan. 2014, 83 pages.
"3rd Generation Partnership Project; Technical Specification Group Services and System Aspects; Specification of the TUAK Algorithm Set: A Second Example Algorithm Set for the 3GPP Authentication and Key Generation Functions f1, f1*, f2, f3, f4, f5 and f5*; Document 1: Algorithm Specification (Release 12)", 3GPP TS 35.231, V12.0.1, Dec. 2013, pp. 1-27.
International Search Report and Written Opinion received for corresponding Patent Cooperation Treaty Application No. PCT/FI2014/050382, dated Dec. 23, 2014, 19 pages.
Blom et al., "Security in the Evolved Packet System", Ericsson, Oct. 1, 2010, pp. 4-9.
"3rd Generation Partnership Project; Technical Specification Group Core Network and Terminals; Mobile radio Interface Layer 3 specification; Core network protocols; Stage 3 (Release 12)", 3GPP TS 24.008, V12.5.0, Mar. 2014, pp. 1-691.
"3rd Generation Partnership Project; Technical Specification Group Services and System Aspects; 3G Security; Security architecture (Release 12)", 3GPP TS 33.102, V12.0.0, Mar. 2014, pp. 1-76.
Extended European Search Report received for corresponding European Patent Application No. 14892452.5, dated Oct. 30, 2017, 8 pages.
$3^{rd}$ Generation Partnership Project; Technical Specification Group Core Network and Terminals; Mobility Management Entity (MME)—Visitor Location Register (VLR) SGs interface specification (Release 12), 3GPP TS 29.118, V12.0.0, Mar. 2013, pp. 1-67.
$3^{rd}$ Generation Partnership Project; Technical Specification Group Core Network and Terminals; Non-Access-Stratum (NAS) protocol for Evolved Packet System (EPS); Stage 3 (Release 12), 3GPP TS 24.301, V12.4.0, Mar. 2014, pp. 1-362.
LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10), ETSI TS 136 300, V10.2.0, (Jan. 2011), pp. 1-12.

* cited by examiner

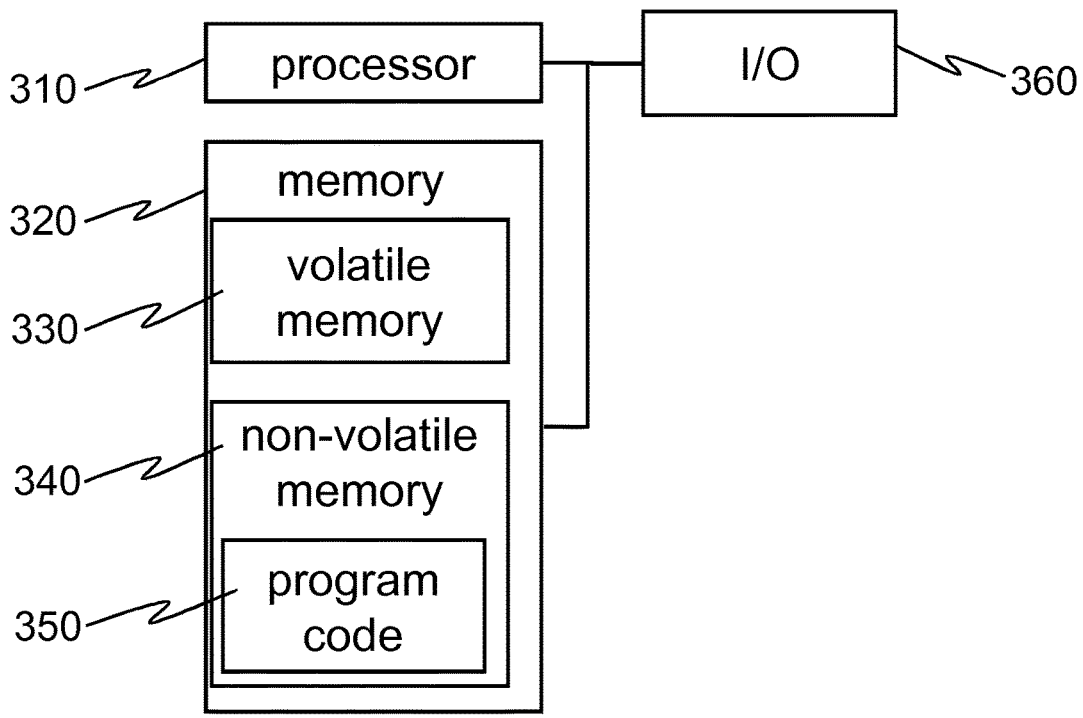
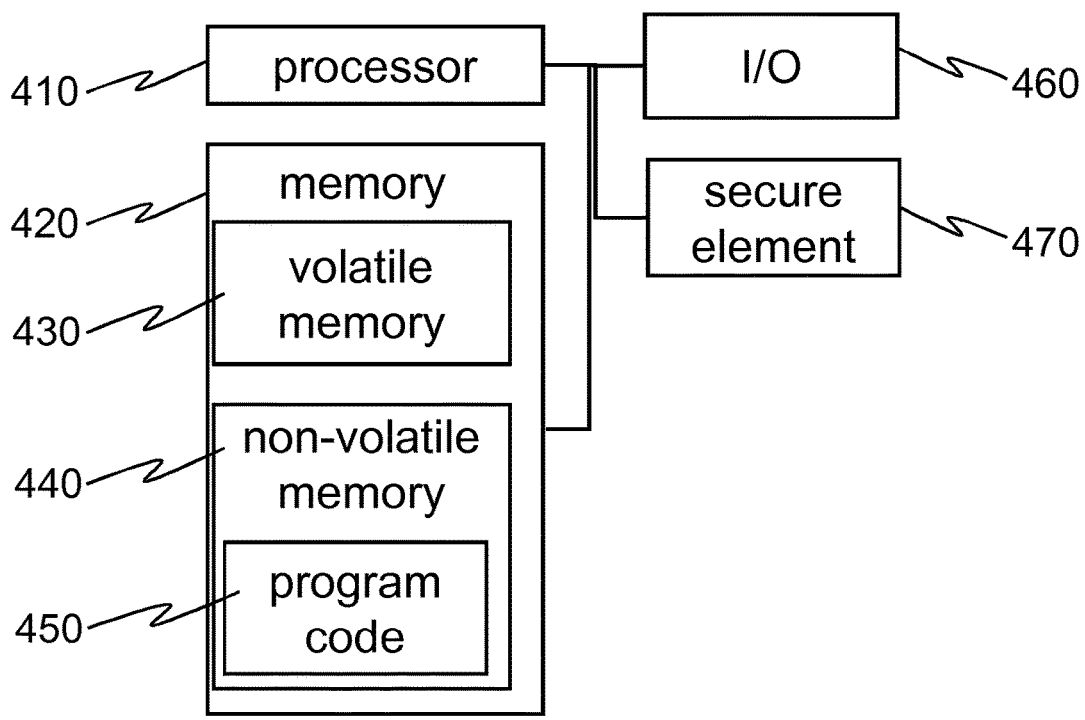

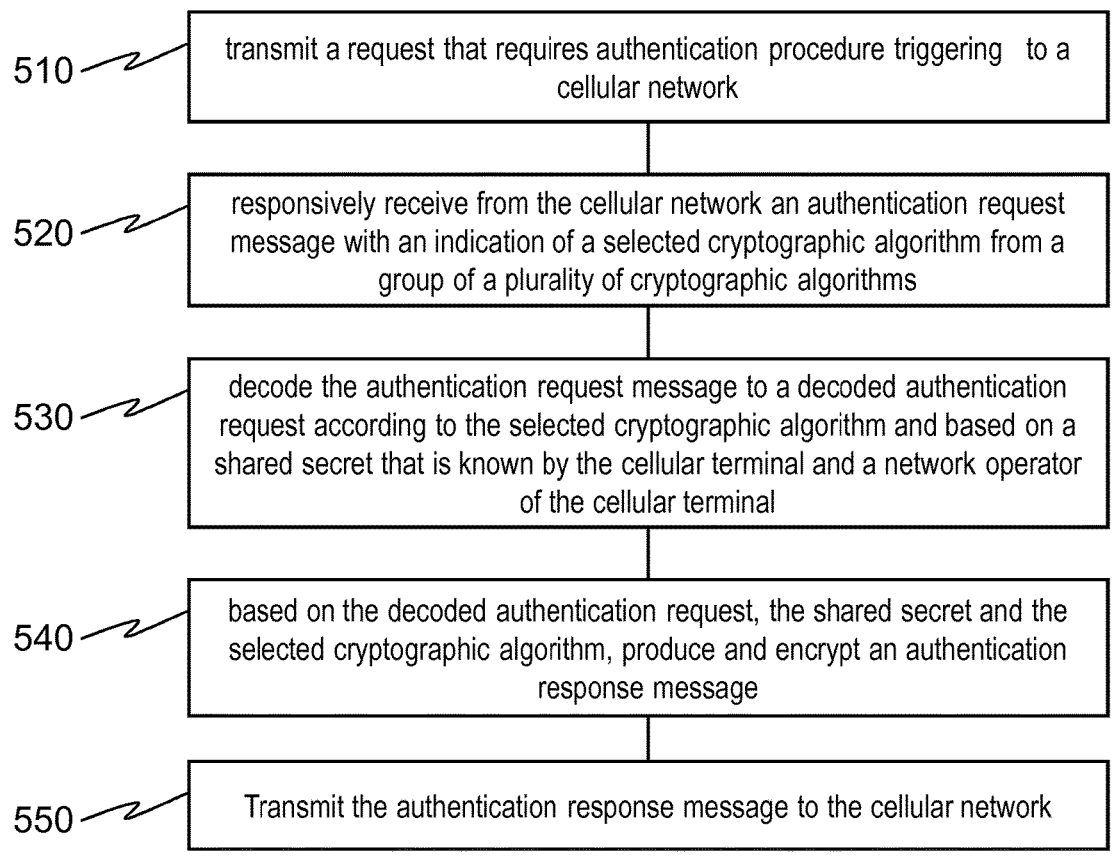

ated as PCT Application
CELLULAR NETWORK AUTHENTICATION

RELATED APPLICATION

This application was originally filed as PCT Application No. PCT/FI2014/050382 filed May 20, 2014.

TECHNICAL FIELD

The present application generally relates to cellular network authentication.

BACKGROUND

This section illustrates useful background information without admission of any technique described herein representative of the state of the art.

Cellular networks or more accurately cellular telecommunications networks are presently a vital tool for modern societies. As a necessary condition, they need to be secured to avoid phone bill frauds and to secure communications against illegal interception of private calls and messages. To this end, telecommunications operators of modern cellular networks protect their subscribers with a host of different techniques that typically rely on digital signal processing.

To enable cellular terminal to start communications, the terminals need to attach to a network in a network attach or network registration process. In the network registration process, a cellular terminal exchanges signals to authenticate itself or more accurately its subscription, typically using a UICC which hosts a Universal subscriber identity module (USIM) application. Sometimes also R-UIM, ISIM, SIM card or SIM application or similar. In the network registration process, the terminal obtains from the network and the SIM access information such as a session key with which the terminal can subsequently communicate in the cellular network. The access information typically changes to prevent re-use of the access information by a possible illegal interceptor.

Encryption is a basic tool that is employed also in other types of digital cellular systems. Already GSM enabled encryption to mitigate illegal interception. The development of computer technology has subsequently made old encryption techniques more vulnerable, but also helped to enhance the security techniques used in cellular systems. For instance, wide-band CDMA (W-CDMA) was designed for stronger security by enabling also the network to authenticate itself to the terminals. In the W-CDMA, the subscriber identity is provided by a Universal Integrated Circuit Card (UICC) that runs a Universal Subscriber Identity Module (USIM). The USIM produces e.g. a session key based on a shared secret stored on the UICC, challenge and replay attack prevention codes received from the network and cryptographic algorithm that is enhanced over the one used in GSM. Also the authentication signaling is enhanced in the W-CDMA over GSM e.g. for protection against some man-in-the-middle attacks.

In parallel with the development of security methods for securing the communications in the cellular systems, there are also growing needs for developing the structure of cellular terminals. At present, most terminals contain an identity module slot in which a user can place and replace an identity module. There is also development towards software based identity modules that are not physically replaceable so as to enable over-the-air change of subscription and/or to prevent theft of the identity module from a terminal. Such software identity modules may be very useful e.g. for built-in vehicular communication systems so that their emergency reporting capabilities and possible burglar control systems could not be easily deactivated by removing an identity module. Those secure modules can be part of the cellular mode, a SoC (System on Chip), a trusted element or trusted platform. Those embedded secure elements are mainly used today for machine type communication, also known as M2M or Internet of Things communications.

Secure embedded elements prevent easy removal by thieves, but on the other hand various cellular communication enabled machines are expected to be in the market for 15-20 years (e.g. traffic lights, electricity and parking meters etc.). Moreover, increasing computational power may help attackers in their attempts to abuse cellular systems.

SUMMARY

Various aspects of examples of the invention are set out in the claims.

According to a first example aspect of the present invention, there is provided a method in a cellular terminal, comprising:

transmitting a request that requires authentication procedure triggering to a cellular network and responsively receiving from the cellular network an authentication request message with an indication of a selected cryptographic algorithm from a group of a plurality of cryptographic algorithms;

decoding the authentication request message to a decoded authentication request according to the selected cryptographic algorithm and based on a shared secret known by the cellular terminal and a network operator of the cellular terminal;

based on the decoded authentication request, the shared secret and the selected cryptographic algorithm, producing and encrypting an authentication response message; and transmitting the authentication response message to the cellular network.

The request that requires authentication procedure triggering may be a network registration request.

The request that requires authentication procedure triggering may be a routing area request.

The request that requires authentication procedure triggering may be a tracking area update request.

The authentication request message may be received from a mobility management entity. The authentication response message may be transmitted to the mobility management entity.

The method authentication request may be an authentication request of an evolved packet system architecture.

The cellular terminal may comprise a security entity. The security entity may comprise a secure element and a subscriber identity application. The cellular terminal may comprise user equipment. The user equipment may be configured to perform communications over radio interface with a base station. The security entity may be configured to decode authentication requests and to produce authentication responses. The user equipment may be selected from a group consisting of: a mobile terminal; a laptop computer; a vehicle; a car; a car key; a portable device; a handheld electronic device; and a single or multifunction device with cellular radio capability. The secure element may be removable or embedded or integrated in an existing processor architecture (e.g. baseband circuitry, main processor, central processing unit, and/or master control unit).

The cryptographic algorithms may be selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

The authentication request message may be an extended authentication request message. The extended authentication request may comprise a message type indication that is configured to cause legacy terminals to neglect the extended authentication request message.

The extended authentication request may comprise a field configured to accommodate a 256 bit authentication token, AUTN.

The authentication token may comprise 128 bits, 192 bits, 256 bits or 320 bits. The authentication token may consist of 128 bits, 192 bits, 256 bits or 320 bits. In case that the authentication token is more than 256 bits, excess bits may be discarded.

The authentication token may comprise a sequence number, SQN. The sequence number may consist of 48 bits.

The authentication token may comprise an anonymity key, AK. The anonymity key may consist of 48 bits.

The authentication token may comprise an authentication management field, AMF. The authentication management field may consist of 16 bits. The authentication management field may comprise 7 spare bits. The spare bits may be used to indicate cryptography adaptation information. The cryptography adaptation information may comprise lengths of different cryptography parameters.

The authentication token may comprise a challenge, RAND. The challenge may consist of 128 bits.

The cellular authentication may employ a cipher key, OK. The cipher key may consist of 64 bits, 128 bits or 256 bits.

The cellular authentication may employ an integrity key, IK. The integrity key may consist of 64 bits, 128 bits or 256 bits.

The cellular authentication may employ a response parameter, RES. The response parameter may consist of 32 bits, 64 bits, 128 bits or 256 bits.

The authentication request message may be an updated authentication request. The updated authentication request may comprise an identifier for indicating which cryptographic algorithm is being used for the authentication. The identifier may be a new field in addition to those in the normal authentication request. The normal authentication request may comply with 3GPP TS 24.301 and 3GPP TS 24.008. Alternatively, the identifier may be contained in one or more bits of the authentication management field, AMF.

The authentication request message may comprise a protocol discriminator. The authentication request message may comprise a security header type. The authentication request message may comprise a non-access stratum key set identifier. The authentication request message may comprise a spare half octet. The authentication request message may comprise a challenge, RAND (e.g. evolved packet system, EPS, challenge). The authentication request message may comprise an authentication token, AUTN. The authentication token may comprise an authentication management field, AMF. The authentication management field may comprise a parameter indicating the length of TUAK to be used (e.g. 128 or 256 bit TUAK).

The message type may match with that of the normal authentication request message. The updated authentication request may comprise a 256 bit authentication token field. The updated authentication request may comprise a 256 bit authentication token field only if a 256 bit authentication token is being used. Otherwise, the updated authentication request may comprise a 128 bit authentication token field.

The authentication response message may comprise a message type indication. The message type indication may identify the authentication response message as an extended authentication response message. The message type indication may match with that of a normal authentication response message. The message type indication of the normal authentication response message may comply with 3GPP TS 24.301.

The extended authentication response message may comprise a variable length authentication response parameter, RES. The authentication response parameter may have a length selected from a group consisting of any one or more of: 32 bits, 64 bits, 128 bits or 256 bits.

The authentication response message may be provided with a new information element in comparison the normal authentication response message. The new information element may be configured to accommodate a 128 bit or a 256 bit authentication response parameter.

The authentication response message may comprise an extended authentication response parameter field that is configured to accommodate a 128 bit or a 256 bit authentication response parameter.

The authentication response message may comprise a cryptography algorithm indication.

According to a second example aspect of the present invention, there is provided a method comprising:

identifying a selected cryptographic algorithm for use by a cellular terminal for authentication of the cellular terminal;

obtaining network credentials corresponding to the selected cryptographic algorithm for the authentication of the cellular terminal;

transmitting to the cellular terminal an authentication request message with an indication of the selected cryptographic algorithm;

receiving an authentication response message from the cellular terminal;

decoding the authentication response message according to the selected cryptographic algorithm; and determining, based on the network credentials and the decoded authentication response message, whether authentication of the cellular terminal is successful or not successful.

The method may be performed by a mobility management entity.

The method authentication request may be an authentication request of an evolved packet system architecture.

The cryptographic algorithm may be selected from a plurality of cryptographic algorithms. The cryptographic algorithms may be selected from a group consisting of MILENAGE; 128 bit TUAK; and 256 bit TUAK.

The identifying of the selected cryptographic algorithm for use by a cellular terminal for authentication of the cellular terminal may be performed by the mobility management entity.

The method may comprise determining if the cellular terminal fails to timely produce a successful response message and subsequently sending a new authentication request message using the selected cryptographic algorithm or selecting another cryptographic algorithm and sending a new authentication request sending a new authentication request message.

The identifying of the selected cryptographic algorithm for use by a cellular terminal for authentication of the cellular terminal may be performed by a home subscriber server.

The transmitting to the cellular terminal of the authentication request message may be performed by using an extended authentication request message. The extended authentication request may comprise a message type indication that is configured to cause legacy terminals to neglect the extended authentication request message.

The method may comprise transmitting the extended authentication request, if the selected cryptographic algorithm use results in data fields the total length of which exceeds the length of a normal authentication request. The extended authentication request may comprise a field configured to accommodate a 256 bit authentication token, AUTN.

The transmitting to the cellular terminal of the authentication request message may be performed by using an updated authentication request. The updated authentication request may comprise an identifier for indicating which cryptographic algorithm is being used for the authentication. The identifier may be added as a new field in addition to those in the normal authentication request. The normal authentication request may comply with 3GPP TS 24.301 or 3GPP TS 24.008. Alternatively, the identifier may be contained in one or more bits of an authentication management field, AMF.

The authentication token may comprise 128 bits, 192 bits, 256 bits or 320 bits. The authentication token may consist of 128 bits, 192 bits, 256 bits or 320 bits. In case that the authentication token is more than 256 bits, excess bits may be discarded.

The authentication token may comprise a sequence number, SQN. The sequence number may consist of 48 bits.

The authentication token may comprise an anonymity key, AK. The anonymity key may consist of 48 bits.

The authentication token may comprise an authentication management field, AMF. The authentication management field may consist of 16 bits. The authentication management field may comprise 7 spare bits. The spare bits may be used to indicate cryptography adaptation information. The cryptography adaptation information may comprise lengths of different cryptography parameters.

The authentication token may comprise a challenge, RAND. The challenge may consist of 128 bits.

The cellular authentication may employ a cipher key, OK. The cipher key may consist of 64 bits, 128 bits or 256 bits.

The cellular authentication may employ an integrity key, IK. The integrity key may consist of 64 bits, 128 bits or 256 bits.

The cellular authentication may employ a response parameter, RES. The response parameter may consist of 32 bits, 64 bits, 128 bits or 256 bits.

The authentication request message may comprise a protocol discriminator. The authentication request message may comprise a security header type. The authentication request message may comprise a non-access stratum key set identifier. The authentication request message may comprise a spare half octet. The authentication request message may comprise a challenge, RAND. The authentication request message may comprise an authentication token, AUTN. The authentication token may comprise an authentication management field, AMF.

The message type may match with that of the normal authentication request message. The updated authentication request may comprise a 256 bit authentication token field. The updated authentication request may comprise a 256 bit authentication token field only if a 256 bit authentication token is being used. Otherwise, the updated authentication request may comprise a 128 bit authentication token field.

The authentication response message may comprise a message type indication. The message type indication may identify the authentication response message as an extended authentication response message. The message type indication may match with that of a normal authentication response message. The message type indication of the normal authentication response message may comply with 3GPP TS 24.008.

The extended authentication response message may comprise a variable length authentication response parameter, RES. The authentication response parameter may have a length selected from a group consisting of any one or more of: 32 bits, 64 bits, 128 bits or 256 bits.

The authentication response message may be provided with a new information element in comparison the normal authentication response message. The new information element may be configured to accommodate a 128 bit or a 256 bit authentication response parameter.

The authentication response message may comprise an extended authentication response parameter field that is configured to accommodate a 128 bit or a 256 bit authentication response parameter.

The authentication response message may comprise a cryptography algorithm indication.

According to a third example aspect of the present invention, there is provided a process comprising the method of the first example aspect and the method of the second example aspect.

According to a fourth example aspect of the present invention, there is provided an apparatus comprising at least one memory and processor that are collectively configured to cause the apparatus to perform the method of the first example aspect.

According to a fifth example aspect of the present invention, there is provided an apparatus comprising at least one memory and processor that are collectively configured to cause the apparatus to perform the method of the second example aspect.

According to a sixth example aspect of the present invention, there is provided an apparatus comprising means for performing the method of the first example aspect.

According to a seventh example aspect of the present invention, there is provided an apparatus comprising means for performing the method of the second example aspect.

According to an eighth example aspect of the present invention, there is provided a system comprising the apparatus of the third or fifth example aspect and the apparatus of the fourth or sixth example embodiment.

According to a ninth example aspect of the present invention, there is provided a computer program comprising computer executable program code configured to execute the method of the first or second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, a smart card and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 3 shows a block diagram of an apparatus of an example embodiment;

FIG. 4 shows a block diagram of an apparatus of an example embodiment; and

FIG. 5 shows a flow chart illustrating a method in a cellular terminal, according to an example embodiment.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
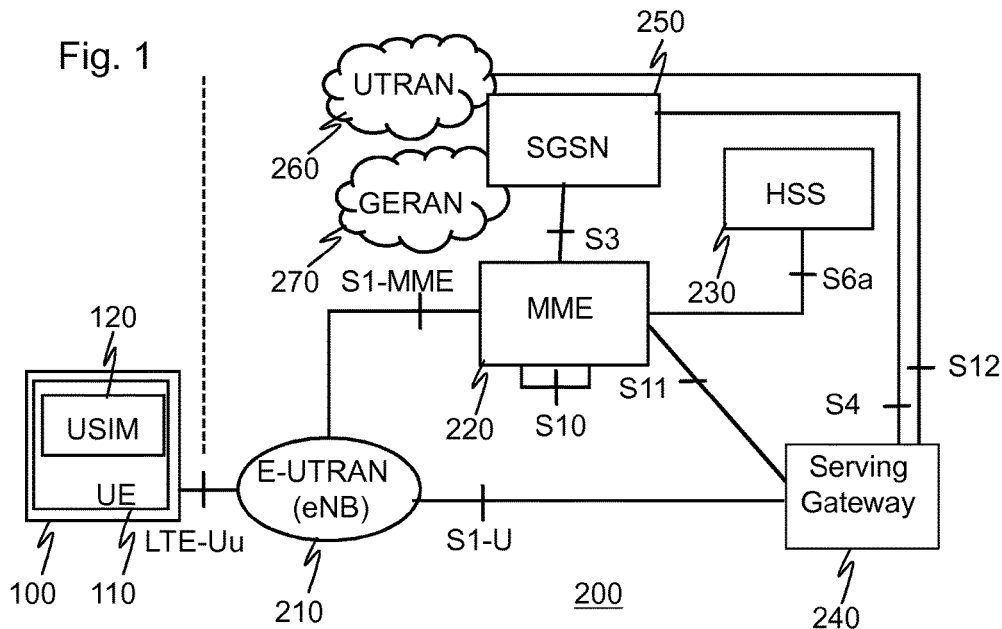
FIG. 1 shows an architectural drawing of a system of an example embodiment.

FIG. 1 an architectural drawing of a system of an example embodiment. A cellular terminal 100 is drawn with user equipment 110 and a secure element containing a USIM 120. In an example embodiment, the USIM is an application on a software implemented security element. The system further comprises a cellular telecommunication network 200 that comprises an E-UTRAN or eNB 210, a mobility management entity MME 220, a home subscriber server, HSS 230 (e.g. home location register HLR, authentication center AuC), a serving gateway 240, a serving gateway support node, SGSN 250, a Universal Terrestrial Radio Access Network, UTRAN 260 and a GSM EDGE Radio Access Network, GERAN 270.

Figure 2:
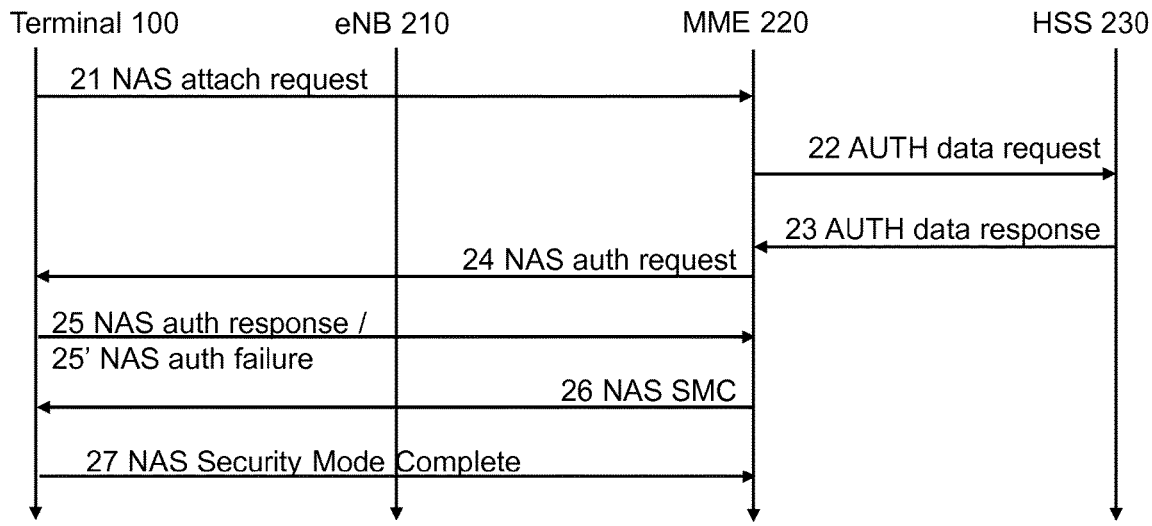
FIG. 2 shows a flow chart of a process of an example embodiment.

FIG. 2 shows a flow chart of a process of an example embodiment. In step 21, the cellular terminal 100 transmits a request that requires authentication procedure triggering to the cellular network 200. For example, the cellular terminal 100 sends a non-access stratum (NAS) attach request or network registration request to the MME 220 via the eNB 210. The MME 220 requests 22 authentication data (e.g. an authentication quintet) from the HSS 230 and responsively receives 23 an authentication data response with the requested authentication data. The MME 220 then responds to the transmitting of the request that requires authentication so that the cellular terminal 100 receives from the cellular network an authentication request message with an indication of a selected cryptographic algorithm from a group of a plurality of cryptographic algorithms. For example, the MME 220 sends 24 an NAS authentication request to the terminal 100 that replies 25 with an NAS authentication response if the terminal 100 is capable of decoding the NAS authentication request and to produce the NAS authentication response.

To this end, the terminal 100 has to support the authentication algorithm used by the MME and possess a shared secret that is known by the HSS 230 and the terminal 100.

If the terminal 100 fails to decode the NAS authentication request, the terminal 100 replies 25' with a NAS authentication failure.

In an example embodiment, the cellular terminal decodes the authentication request message to a decoded authentication request according to the selected cryptographic algorithm and based on a shared secret known by the cellular terminal and a network operator of the cellular terminal. Based on the decoded authentication request, the shared secret and the selected cryptographic algorithm, the cellular terminal 100 produces and encrypts an authentication response message in an example embodiment (e.g. for replying in step 25).

After successful decoding of the NAS authentication request and the responsive NAS authentication response, the MME sends 26 to the terminal 100 a NAS security mode completion message and the terminal 100 replies 27 with a corresponding NAS security mode complete message. In another example embodiment, either or both the NAS security mode completion and NAS security mode complete reply is/are omitted or substituted by one or more other signals or messages.

Various messages of FIG. 2 and their processing can be implemented in a large variety of different ways.

In an example embodiment, the process of FIG. 2 starts from another request that requires authentication procedure triggering such as a tracking area update request or a routing area request to the cellular network 200 instead of the network registration request.

In an example embodiment, the authentication request message 24 comprises an indication of a selected cryptographic algorithm from a group of a plurality of cryptographic algorithms. In an example embodiment, the cryptographic algorithms are selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

In an example embodiment, the selected cryptographic algorithm employs a cipher key, CK. The cipher key may consist of 64, 128 or 256 bits.

In an example embodiment, the selected cryptographic algorithm employs an integrity key, IK. The integrity key may consist of 64, 128 or 256 bits.

In an example embodiment, the selected cryptographic algorithm employs a response parameter, RES. The response parameter may consist of 32, 64, 128 or 256 bits.

In an example embodiment, the authentication request message 24 is an extended authentication request message. In an example embodiment, the extended authentication request comprises a message type indication that is configured to cause legacy terminals to neglect the extended authentication request message.

In an example embodiment, the extended authentication request comprises a field configured to accommodate a 256 bit authentication token, AUTN.

In an example embodiment, the authentication request message 24 is an updated authentication request. In an example embodiment, the updated authentication request comprises an identifier for indicating which cryptographic algorithm is being used for the authentication. In an example embodiment, the identifier is a new field in addition to those in the normal authentication request. In an example embodiment, the normal authentication request complies with 3GPP TS 24.301 or 3GPP TS 24.008. In an example embodiment, the identifier is contained in one or more bits of the authentication management field, AMF.

In an example embodiment, the authentication request message 24 comprises a protocol discriminator. In an example embodiment, the authentication request message comprises a security header type. In an example embodiment, the authentication request message comprises a non-access stratum key set identifier. In an example embodiment, the authentication request message comprises a spare half octet. In an example embodiment, the authentication request message comprises a challenge, RAND (e.g. evolved packet system, EPS, challenge). In an example embodiment, the authentication request message comprises an authentication token, AUTN. In an example embodiment, the authentication token comprises an authentication management field, AMF. The authentication management field may comprise a parameter indicating the length of TUAK to be used (e.g. 128 bit TUAK or 256 bit TUAK).

In an example embodiment, the message type of the updated authentication request matches with that of the normal authentication request message. In an example embodiment, the updated authentication request comprises a 256 bit authentication token field. The updated authentication request may comprise a 256 bit authentication token field only if a 256 bit authentication token is being used. Otherwise, the updated authentication request may comprise a 128 bit authentication token field.

In an example embodiment, the authentication token comprises 128 bits, 192 bits, 256 bits or 320 bits. In an example embodiment, the authentication token consists of 128 bits, 192 bits, 256 bits or 320 bits. In case that the authentication token is more than 256 bits, excess bits may be discarded.

In an example embodiment, the authentication token comprises a sequence number, SQN. In an example embodiment, the sequence number consists of 48 bits.

In an example embodiment, the authentication token comprises an anonymity key, AK. In an example embodiment, the anonymity key consists of 48 bits.

In an example embodiment, the authentication token comprises an authentication management field, AMF. In an example embodiment, the authentication management field consists of 16 bits. In an example embodiment, the authentication management field comprises 7 spare bits. In an example embodiment, the spare bits are used to indicate cryptography adaptation information. In an example embodiment, the cryptography adaptation information comprises lengths of different cryptography parameters.

In an example embodiment, the authentication token comprises a challenge, RAND. In an example embodiment, the challenge consists of 128 bits.

In an example embodiment, the decoding the authentication request message 24 to a decoded authentication request is performed according to the selected cryptographic algorithm and based on a shared secret known by the cellular terminal and a network operator of the cellular terminal.

In an example embodiment, the process comprises, based on the decoded authentication request, the shared secret and the selected cryptographic algorithm, producing and encrypting the authentication response message 25.

In an example embodiment, the authentication response message 25 comprises a message type indication. In an example embodiment, the message type indication identifies the authentication response message as an extended authentication response message. In an example embodiment, the message type indication matches with that of a normal authentication response message. In an example embodiment, the message type indication of the normal authentication response message complies with 3GPP TS 24.301.

In an example embodiment, the extended authentication response message comprises a variable length authentication response parameter, RES. In an example embodiment, the authentication response parameter has a length selected from a group consisting of any one or more of: 32 bits, 64 bits, 128 bits or 256 bits.

In an example embodiment, the authentication response message 25 is provided with a new information element in comparison the normal authentication response message. In an example embodiment, the new information element is configured to accommodate a 128 bit or a 256 bit authentication response parameter.

In an example embodiment, the authentication response message 25 comprises an extended authentication response parameter field that is configured to accommodate a 128 bit or a 256 bit authentication response parameter.

In an example embodiment, the authentication response message 25 comprises a cryptography algorithm indication.

FIG. 3 shows an example block diagram of an apparatus 300 according to an example embodiment. The apparatus 300 comprises a memory 320 that comprises a volatile memory 330 and a non-volatile memory 340 that is configured to store computer programs or software comprising computer program code 350. The apparatus 300 further comprises at least one processor 310 for controlling the operation of the apparatus 300 using the computer program code 350 and an input/output system 360 for communicating with other entities or apparatuses. Accordingly, the input/output system 360 comprises one or more communication units or modules providing communication interfaces towards other entities and/or apparatuses. In an example embodiment, the processor 310 is configured to run the program code 350 in the volatile memory 330. In an example embodiment, the apparatus 300 is configured to operate as the MME 220.

The processor 310 comprises, for example, any one or more of: a master control unit (MCU); a microprocessor; a digital signal processor (DSP); an application specific integrated circuit (ASIC); a field programmable gate array; and a microcontroller.

FIG. 4 shows an example block diagram of an apparatus 400 according to an example embodiment. The apparatus 400 comprises a memory 420 that comprises a volatile memory 430 and a non-volatile memory 440 that is configured to store computer programs or software comprising computer program code 450. The apparatus 400 further comprises at least one processor 410 for controlling the operation of the apparatus 400 using the computer program code 450. The apparatus 400 further comprises an input/output system 460 for communicating with other entities or apparatuses. Accordingly, the input/output system 460 comprises one or more communication units or modules providing communication interfaces towards other entities and/or apparatuses. The apparatus 400 further comprises a secure element (SE) 470 secure element that contains one or more network access applications such as SIM(s) or USIM(s). In an example embodiment, the SE 470 is an application that is hosted by a secure element which is implemented as software. In another example embodiment, the secure element 470 comprises a universal integrated circuit card, UICC. In an example embodiment, the processor 410 is configured to run the program code 450 in the volatile memory 430. In an example embodiment, the apparatus 400 is configured to operate as the cellular terminal 100.

The processor 410 comprises, for example, any one or more of: a master control unit (MCU); a microprocessor; a digital signal processor (DSP); an application specific integrated circuit (ASIC); a field programmable gate array; and a microcontroller.

FIG. 5 shows a flow chart illustrating a method in a cellular terminal, according to an example embodiment, comprising:

transmitting 510 a request that requires authentication procedure triggering to a cellular network and responsively receiving 520 from the cellular network an authentication request message with an indication of a selected cryptographic algorithm from a group of a plurality of cryptographic algorithms;

530 decoding the authentication request message to a decoded authentication request according to the selected cryptographic algorithm and based on a shared secret known by the cellular terminal and a network operator of the cellular terminal;

based on the decoded authentication request, the shared secret and the selected cryptographic algorithm, producing and encrypting an authentication response message, 540; and 550 transmitting the authentication response message to the cellular network.

Without in any way limiting the scope, interpretation, or application of the claims appearing below, a technical effect of one or more of the example embodiments disclosed herein is that it may be possible to run the cellular authentication procedure, in particular authentication request and response, with TUAK, when two or more potential algorithms are available (e.g. Milenage and TUAK), especially if the TUAK algorithm might be used with 128 bit or 256 bit.

Another technical effect of one or more of the example embodiments disclosed herein is that the network and secure element can be dynamically fitted with desired cryptographic algorithm.

Another technical effect of one or more of the example embodiments disclosed herein is that the cryptographic operations can be supported also if normal cellular authentication procedure would fail.

Another technical effect of one or more of the example embodiments disclosed herein is that while presently a typically user obtains a new UICC when changing operators and the operator is thus aware of the content and capabilities of that UICC, in case of an embedded secure element, the user or owner of the subscription such as a party managing cellular communicating machines may change operator of a machine in which case the new operator may not be aware of the content and/or capabilities of the UICC but yet the new operator may be able to enable enhanced security of the cellular authentication procedure.

Embodiments of the present invention may be implemented in software, hardware, application logic or a combination of software, hardware and application logic. The software, application logic and/or hardware may reside on memory 320, non-volatile memory 340, memory 420 or non-volatile memory 440. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 3 or FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A method in a cellular terminal, the method comprising:
    transmitting a request requiring authentication procedure triggering to a mobility management entity of a cellular network;
    receiving from the mobility management entity of the cellular network an authentication request message with an indication of a cryptographic algorithm selected from a group of a plurality of cryptographic algorithms provided to the mobility management entity by a home subscriber server;
    decoding the authentication request message to obtain a decoded authentication request according to the selected cryptographic algorithm and based on a shared secret known by the cellular terminal and a network operator of the cellular terminal;
    based on the decoded authentication request, the shared secret and the selected cryptographic algorithm, producing and encrypting an authentication response message;
    transmitting the authentication response message to the mobility management entity of the cellular network, the authentication response message including a cryptography algorithm indication;
    receiving a security mode completion message from the mobility management entity of the cellular network; and
    sending a security mode complete reply to the mobility management entity of the cellular network to complete a registration process,
    wherein the cryptographic algorithms are selected from a group consisting of MILENAGE; 128 bit TUAK; and 256 bit TUAK,
    wherein the authentication request message is an extended authentication request message, and
    wherein the extended authentication request message comprises an authentication token that comprises 128 bits, 192 bits, 256 bits or 320 bits.

2. The method of claim 1, wherein the request that requires authentication procedure triggering is a network registration request.

3. The method of claim 1, wherein the request that requires authentication procedure triggering is a routing area request.

4. The method of claim 1, wherein the request that requires authentication procedure triggering is a tracking area update request.

5. The method of claim 1, wherein the authentication request message is received from a mobility management entity.

6. The method of claim 1, wherein the authentication response message is transmitted to the mobility management entity.

7. The method of claim 1, wherein the cellular terminal comprises a security entity.

8. The method of claim 7, wherein the security entity comprises a secure element and a subscriber identity application.

9. The method of claim 8, wherein the secure element is removable or embedded or integrated in an existing processor architecture.

10. The method of claim 7, wherein the security entity is configured to decode authentication requests and to produce authentication responses.

11. The method of claim 1, wherein the extended authentication request comprises a message type indication that is configured to cause legacy terminals to neglect the extended authentication request message.

12. The method of claim 1, wherein the authentication token comprises a sequence number, SQN.

13. The method of claim 12, wherein the sequence number consists of 48 bits.

14. The method of claim 1, wherein the authentication token comprises an anonymity key, AK.

15. The method of claim 1, wherein the authentication token comprises an authentication management field which indicates cryptography adaptation information.

16. A method in a mobility management entity, the method comprising:
receiving a request requiring authentication procedure triggering from a cellular terminal;
requesting authentication data from a home subscriber server;
receiving an authentication data response from the home subscriber server with the requested authentication data;
identifying a cryptographic algorithm selected from a group of a plurality of cryptographic algorithms for use by a cellular terminal for authentication of the cellular terminal;
obtaining network credentials corresponding to the selected cryptographic algorithm for the authentication of the cellular terminal;
transmitting to the cellular terminal an authentication request message with an indication of the selected cryptographic algorithm, the authentication request message being decodable by the cellular terminal to obtain an authentication request decoded according to the selected cryptographic algorithm and based on a shared secret known by the cellular terminal and a network operator of the cellular terminal;
receiving an authentication response message from the cellular terminal, the authentication response message including a cryptography algorithm indication;
decoding the authentication response message according to the selected cryptographic algorithm;
determining, based on the network credentials and the decoded authentication response message, whether authentication of the cellular terminal is successful or not successful;
when authentication is successful, sending a security mode completion message to the cellular terminal; and
receiving a security mode complete reply from the cellular terminal to complete a registration process,
wherein the cryptographic algorithms are selected from a group consisting of MILENAGE; 128 bit TUAK; and 256 bit TUAK,
wherein the authentication request message is an extended authentication request message, and
wherein the extended authentication request message comprises an authentication token that comprises 128 bits, 192 bits, 256 bits or 320 bits.

17. An apparatus comprising:
at least one memory and processor that are collectively configured to cause the apparatus to perform the steps of:
transmitting a request requiring authentication procedure triggering to a mobility management entity of a cellular network;
receiving from the mobility management entity of the cellular network an authentication request message with an indication of a cryptographic algorithm selected from a group of a plurality of cryptographic algorithms provided to the mobility management entity by a home subscriber server;
decoding the authentication request message to obtain a decoded authentication request according to the selected cryptographic algorithm and based on a shared secret known by the cellular terminal and a network operator of the cellular terminal;
based on the decoded authentication request, the shared secret and the selected cryptographic algorithm, producing and encrypting an authentication response message;
transmitting the authentication response message to the mobility management entity of the cellular network, the authentication response message including a cryptography algorithm indication;
receiving a security mode completion message from the mobility management entity of the cellular network; and
sending a security mode complete reply to the mobility management entity of the cellular network to complete a registration process,
wherein the cryptographic algorithms are selected from a group consisting of MILENAGE; 128 bit TUAK; and 256 bit TUAK,
wherein the authentication request message is an extended authentication request message, and
wherein the extended authentication request message comprises an authentication token that comprises 128 bits, 192 bits, 256 bits or 320 bits.

* * * * *